United States Patent [19]

Harris

[11] 4,130,144

[45] Dec. 19, 1978

[54] APPARATUS AND METHOD FOR DISPENSING FLUID WITHIN A TIRE

[75] Inventor: James T. Harris, Cuyahoga Falls, Ohio

[73] Assignee: The Goodyear Tire & Rubber Company, Akron, Ohio

[21] Appl. No.: 731,217

[22] Filed: Oct. 12, 1976

[51] Int. Cl.² .......................... B60C 17/00; B65B 3/04
[52] U.S. Cl. ............................................ 141/9; 141/38; 152/330 L
[58] Field of Search ......... 152/330 L, 330 C, DIG. 5, 152/152, 153, 339 T, 342; 141/9, 38

[56]  References Cited
U.S. PATENT DOCUMENTS 3,511,294  5/1970  Bepristis et al. ................ 152/330 L

FOREIGN PATENT DOCUMENTS 680108  10/1952  United Kingdom ............... 152/DIG. 5
1400430  7/1975  United Kingdom ................ 152/330 L Primary Examiner—Robert B. Reeves
Assistant Examiner—Francis J. Bartuska
Attorney, Agent, or Firm—Frederick K. Lacher; J. A. Rozmajzl

[57]  ABSTRACT

An enclosed container having a divided chamber with an air pressure section and a liquid coolant section separated by a pressure-transmitting wall. A one-way inflation valve in the container is in communication with the air pressure section for inflation of this section. A liquid release valve in the container is in communication with the liquid coolant section and is set to release liquid into a tire cavity when the tire is operated in a deflated condition. The container is of a resilient, noncollapsible material for retaining air under pressure and for gripping the rim on which the tire is mounted.

The method of dispensing liquid coolant includes pouring the coolant into the liquid section, inflating the air pressure section to bleed the air out of the liquid section, mounting the container on the rim with the inflation valve and release valve in communication with the tire cavity, inflating the tire to normal tire mounting pressure to provide liquid ejecting pressure in the air pressure section of the container, reducing the air pressure in the tire cavity to a normal tire operating pressure, and releasing the liquid coolant from the liquid section upon opening of the release valve in response to reduction of the air pressure in the tire cavity to an amount below the normal operating pressure as in the event of a puncture or blowout for cooling and lubrication of the tire.

19 Claims, 7 Drawing Figures

APPARATUS AND METHOD FOR DISPENSING FLUID WITHIN A TIRE

This invention relates to the dispensing of fluid within a tire cavity to cool and lubricate the tire when the tire is operated in the deflated condition.

Heretofore, fluid containers have been positioned inside and outside the tire cavity and various devices utilized to release the fluid in response to operation of the tire in the deflated condition. Some of these devices have been actuated by contact with the deflated tire which in some cases engaged a plunger valve and in other cases ruptured a part of the container. Other devices for releasing the fluid have been activated in response to the increased temperature in the tire cavity caused by the operation of the tire in the deflated condition.

In still another device, the coolant was contained in a divided chamber with an air pressure section open to the tire cavity. The normal operating pressure in the tire forced the coolant into the tire; however, the amount of coolant which could be injected from a chamber of reasonable size was seriously limited. In order to reduce the size of the chamber, it was necessary to use different diameter pistons for increasing the effective pressure.

Most of the devices proposed for releasing fluid into a tire cavity have required destruction of the fluid container or connected parts. Where valves have been used they have been actuated prematurely. Where heat-sensitive seams of containers have been used to release the fluid at high temperatures, sometimes the tire has been destroyed before the release of the fluid.

An object of this invention is to provide a reusable container responsive to a drop in pressure in the tire to release liquid fluid into a tire cavity.

Another object is to provide a container having a divided chamber for a liquid fluid and a gaseous fluid under pressure.

A further object is to provide valves in the fluid container for inflation and retention of gaseous fluid under pressure and release of liquid fluid at a predetermined differential between the pressure within the tire cavity and the pressure within the fluid container.

A still further object is to provide a divider in the chamber of the container for transmitting pressure from the gaseous fluid to the liquid fluid.

Another object is to provide a noncollapsible container of resilient material for retaining fluid under high pressures and resiliently deforming to fit over a wheel rim and grip the surface of the rim.

A further object is to provide a container for mounting on the rim inside or outside the tire cavity.

A still further object is to provide a method of dispensing fluid from a container in which the tire mounting pressure is utilized to provide a high gaseous fluid pressure in the container.

Another object is to provide a method in which a first predetermined quantity of liquid fluid is poured into the container and released into the tire cavity upon deflation of the tire below a predetermined pressure.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but some of the various ways in which the principles of the invention may be employed.

Figure 1:
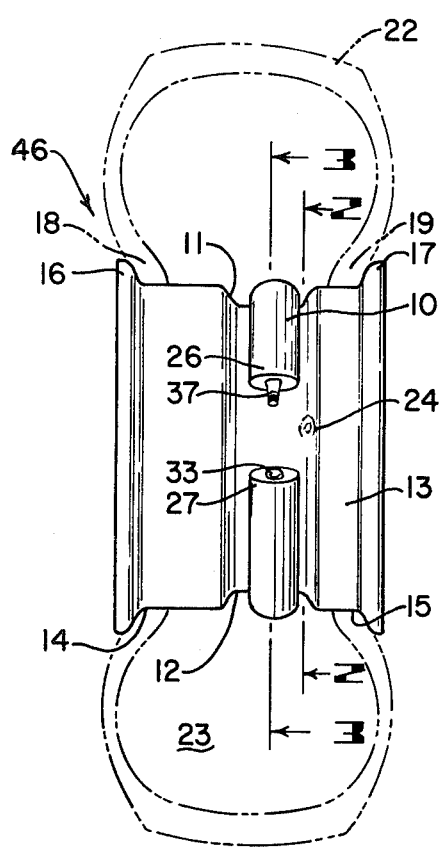
FIG. 1 is an elevation of a wheel rim with a fluid dispenser of this invention mounted thereon, a section of a tire for this rim being shown in chain-dotted lines.

Referring to the drawings and particularly to FIGS. 1, 2, 3 and 4, a fluid dispenser such as an enclosed container in the form of a hollow split ring 10 is shown mounted in the drop center well 11 at a radially outer surface 12 of a rim 13 on a wheel (not shown). The rim 13 may have bead seats 14 and 15 adjacent flanges 16 and 17 for receiving the beads 18 and 19 of a tire 22 shown in chain-dotted lines in FIG. 1. The tire 22 may be of the type not requiring a tube and having a tire cavity 23 enclosed by the radially outer surface 12 of the rim 13 and in communication with a source of air pressure through tire inflation valve 24 mounted in the wall of the well 11.

The split ring 10 is in the form of an elongated tube of a material such as rigid vinyl which has sufficient rigidity to maintain the tubular shape of the ring and not collapse when subjected to pressure differentials between a chamber 25 within the ring and the pressure in the tire cavity 23. The ring 10 also has sufficient resiliency to be expanded for pulling over the rim flanges 16 or 17 during mounting on the rim 13. Preferbly the diameter of the ring 10 is less than the diameter of the radially outer surface 12 at the well 11 so that the ring will be mounted on the rim 13 in a prestressed conditon for gripping the rim tightly even at high speeds. The ring 10 has an inflation end 26 and a liquid release end 27. The liquid release end 27 has a threaded end plug 28 with threads 29 for sealing engagement with threads 32 on the inner wall of the ring 10 at the liquid release end. A one-way release valve 33 is mounted in the end plug 28 and may be of the type having a valve core spring. The core spring of release valve 33 may be set to release liquid from inside the ring 10 when the differential between the pressure in the tire cavity 23 and within the chamber 25 exceeds a predetermined amount. In this embodiment, the release valve 33 is set to release fluid when the differential pressure exceeds 24 p.s.i.

Figure 3:
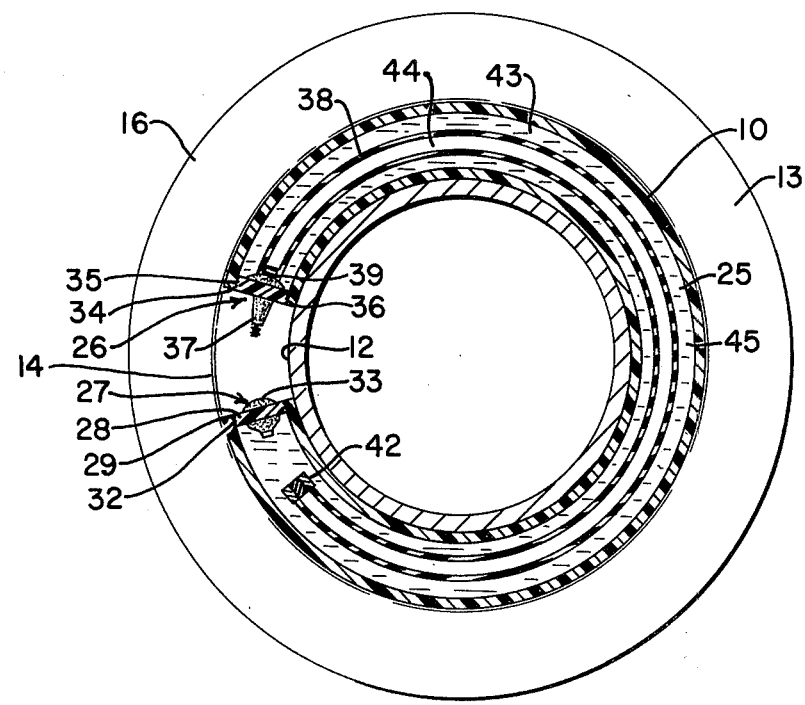
FIG. 3 is an enlarged sectional view of the fluid dispenser of this invention mounted on the rim, taken along the plane of line 3—3 in FIG. 1.

The inflation end 26 of the ring 10 is spaced from the liquid release end 27 and is closed by an inflation end plug 34 having threads 35 for sealing engagement with threads 36 in the wall of the ring. The inflation end plug 34 is fitted with an inflation valve 37 of the type having a valve core spring 40 which may be set to permit the passage of fluid in one direction only after the pressure has reached a predetermined value which in this embodiment is one-half p.s.i. The inflation valve 37 is connected to a divider or pressure-transmitting means such as bladder 38 which may be in the form of an elongated tubular body of elastomeric material such as latex rubber. The bladder 38 is connected to the inflation valve 37 at an open end 39 and extends through the ring 10 to a spaced-apart position where a closed end 42 is located as shown in FIG. 3. With this construction, the chamber 25 within the ring 10 is divided by the bladder 38 into a liquid-containing section 43 and an air or a gaseous fluid air-containing section 44 within the bladder 38.

Figure 2:
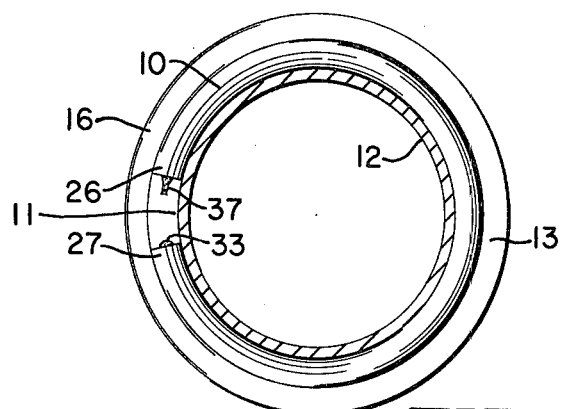
FIG. 2 is a side elevation in section taken along the plane of line 2—2 in FIG. 1.
Figure 4:
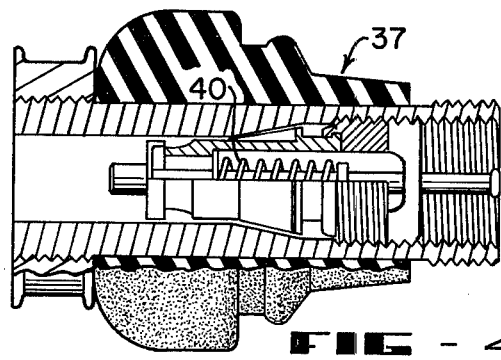
FIG. 4 is an enlarged sectional view of the one-way valve for gaseous fluid shown in FIG. 3.

In operation of the fluid dispenser ring 10, shown in FIGS. 1, 2 and 3, the end plug 28 is removed from the liquid release end 27 of the ring by turning to unscrew the plug from the end. The desired amount of liquid fluid such as lubricant coolant 45 is poured into the liquid-containing section 43 of the divided chamber 25. The lubricant coolant 45 may be a suitable liquid including lubricants for rubber such as water and oils as well as antifreeze solutions such as alcohol and ethylene glycol. For the 14" wheel of the embodiment shown, around one pint of lubricant coolant 45 is poured into the ring 10 after which the end plug 28 is screwed back into the liquid release end 27 of the ring. Air under pressure is then communicated to the air-containing section 44 within the bladder 38 and raised to such a pressure that the air in the liquid-containing section 43 will be bled through the release valve 33 until the lubricant coolant 45 starts to come out of the release valve so that the liquid-containing section will contain only the lubricant coolant. The air pressure may then be released through inflation valve 37 and the ring 10 is ready for installation.

To install the ring 10, it is placed within the tire 22. The bead 18 is pulled over the rim flange 17 by placing one portion of the bead in the well 11 and then pulling the other portion over the flange. The ring 10 is then pulled over the rim flange 17 in a similar manner; however, because of the reduced diameter of the ring, the ends 26 and 27 are spread apart for pulling the ring over the flange 17. The ring 10 is then moved over the well 11 to a position on the rim adjacent the bead seat 14 so that the other bead 19 of the tire may be pulled over the flange 17 with one portion in the well. After both beads 18 and 19 have been pulled over the flange 17, the ring 10 is moved into the well 11 where the resiliency of the ring and the molded diameter which is less than the diameter of the radially outer surface 12 of the well provides a tight gripping action of the ring in the well. The ring 10 is positioned so that the tire inflation valve 24 is located between the ends 26 and 27 of the ring and communication of air pressure into the tire cavity 23 through the tire inflation valve 24 is not blocked by the ring.

The tire 22 is then inflated to a tire mounting pressure of 40 p.s.i. within the tire cavity 23 which is the normal pressure applied to seat the beads 18 and 19 in the bead seats 14 and 15 against the flanges 16 and 17. This tire mounting pressure communicated through the tire inflation valve 24 is also communicated through the ring inflation valve 37 to the air-containing section 44 of the chamber 25 and results in a pressure within the bladder 38 of 39.5 p.s.i. since the ring inflation valve spring 40 is set to open at a pressure of one-half p.s.i.

The air pressure in the tire cavity 23 is then reduced to a normal operating pressure of around 24 p.s.i. Because the release valve 33 is set to release the lubricant coolant 45 when the pressure in the chamber 25 exceeds the pressure in the cavity by 24 p.s.i., the lubricant coolant will be retained in the ring after the pressure in the tire cavity is reduced to the operating pressure of 24 p.s.i.

Upon deflation of the tire 22 due to a puncture or blowout, a drop in the air pressure within the tire cavity 23 will occur and when it drops below 15-½ p.s.i., the release valve 33 will open because at that point the pressure differential between the 39.5 p.s.i. pressure in the air-containing section 44 of the chamber 25 and the pressure in the tire cavity 23 will exceed 24 p.s.i. The release valve 33 will remain open as long as this pressure differential exists and the pressure in the air-containing section 44 will force the lubricant coolant 45 out of the liquid-containing section 43 of the chamber 25 into the tire cavity 23. The lubricant coolant 45 provides cooling through condensation and also lubricates the tire 22 to prevent damage when it is operated in the deflated condition.

The size of the chamber 25 for a specified amount of lubricant coolant 45 to be released may be determined by applying Boyle's Law to the conditions of pressure and volume of air within the chamber. The initial pressure is 39.5 p.s.i. plus 14.7 p.s.i. and the initial volume is the total volume of the chamber less the lubricant coolant 45 to be released. The final pressure is 24 p.s.i. plus 14.7 p.s.i. which is the pressure differential set in the release valve 33. The final volume is the volume of the chamber since all of the lubricant coolant 45 is released. In the embodiment described above, the desired amount of lubricant coolant 45 to be released is one pint or around 28.4 cubic inches and the total volume of the chamber 25 is around 99 cubic inches.

After the lubricant coolant 45 has been released into the tire cavity 23, the tire and wheel assembly 46, shown in FIG. 1, may be operated in the deflated condition for a sufficient distance to reach a point where repairs can be made safely and the lubricant coolant serves to prevent damage to the tire through abrasion and high temperatures. In addition, the ring 10 located in the well 11 may be of sufficient size to prevent the beads 18 and 19 from entering the well and thereby prevents the tire 22 from coming off the wheel rim 13. The ring 10 may be removed from the rim 13 by reversing the process of mounting the ring and then may be reused without any replacement of parts or repairs.

Figure 5:
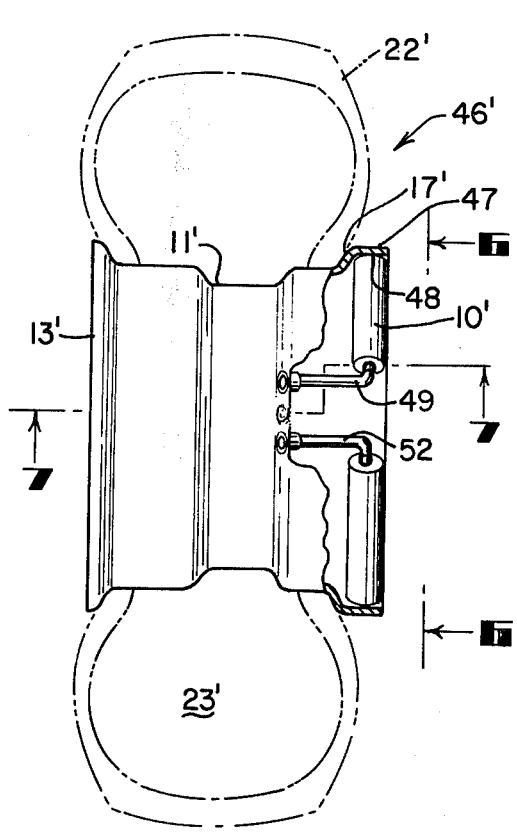
FIG. 5 is an elevation with parts being broken away of a wheel rim with a modified fluid dispenser of this invention mounted thereon, a section of a tire for the rim being shown in chain-dotted lines.
Figure 6:
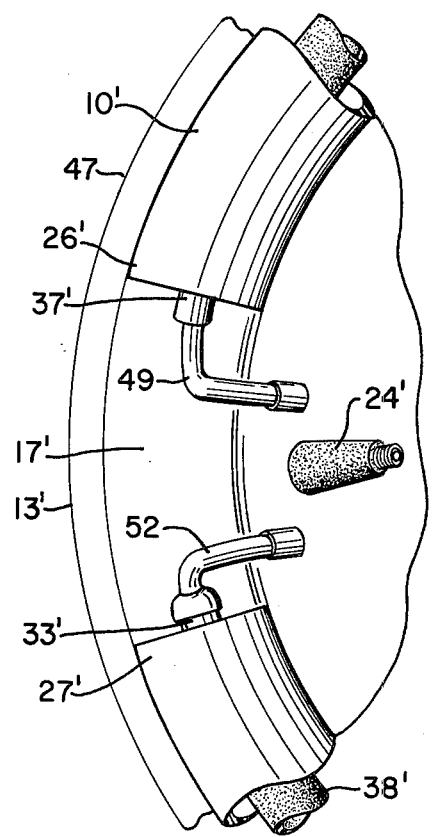
FIG. 6 is an enlarged fragmentary side elevation taken along the plane of line 6—6 in FIG. 5.
Figure 7:
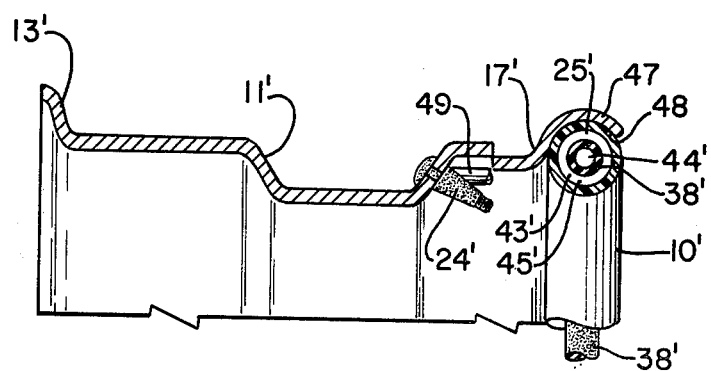
FIG. 7 is an enlarged fragmentary cross-sectional view taken along the planes of line 7—7 in FIG. 5.

Referring to FIGS. 5, 6 and 7, a modification of the invention is shown in which the fluid-dispensing ring 10' is mounted within a generally cylindrical extension 47 of the tire rim flange 17'. The tire and wheel assembly 46' has a tire 22' shown in chain-dotted lines mounted on a rim 13' having a well 11' and a tire inflation valve 24' mounted in the rim for communication of air pressure into the tire cavity 23'.

Preferably the ring 10' has an outer diameter greater than radially inner surface 48 of the wheel rim 13' at the cylindrical extension 47 so that the ring after installation with the extension will grip the surface and remain in place during operation of the tire and wheel assembly 46'. The ring inflation valve 37' is connected to the wall of the rim 13' by a connecting tube 49 for communication of air pressure from the tire cavity 23' through the rim and connecting tube to the air-containing section 44' within the bladder 38' in the chamber 25'. Likewise the release valve 33' is connected to the wall of the rim 13' by a connecting tube 52 for communication of air pressure from the tire cavity 23' to the liquid-containing section 43' and release of the lubricant coolant 45' into the tire cavity 23'.

With this modification, the lubricant coolant 45' is poured into the ring 10' and the liquid-containing section 43' bled in the same manner as described above for the embodiment of FIGS. 1, 2 and 3 prior to mounting the ring within the cylindrical extension 47. The ring 10' is then decreased in diameter by pulling the inflation end 26' toward the liquid release end 27' and inserted within the cylindrical extension 47 whereupon the ends are released and the ring springs outward into engagement with the radially inner surface 48 of the rim 13' at the extension. The connecting tubes 49 and 52 are then connected in sealing engagement with the rim 13'. The operation of the ring 10' is substantially the same as the operation of the ring 10 of the embodiment of FIGS. 1 through 3.

Although in the embodiments of FIGS. 1 through 4 and 5 through 7, the rings 10 and 10' have been held on the rim by the spring forces of the ring, the rings 10 and 10' may also be adhered to the rim 13 and 13' by the use of suitable adhesives. It is understood that other pressure-transmitting means may be used in the divided chambers 25 and 25', as, for example, a piston movable lengthwise within the chamber.

It is also within the scope of this invention to provide a fluid dispenser like that shown in the drawings and described hereinabove but with open end 39 of bladder 38 connected to the release valve 33 and the inflation valve 37 opening directly into the chamber 25. with this construction the coolant 45 is contained in the chamber 25 around the bladder 38. Then after filling the bladder 38 with coolant 45, no bleeding of the chamber 25 is required.

Even though certain representative embodiments and details have been shown for the purpose of illustrating the invention, it will be apparent to those skilled in the art that various changes and other modifications may be made therein without departing from the invention.

What is claimed is:

1. A fluid dispenser for dispensing fluid into a tire cavity comprising an enclosed container, a divided chamber within said container for containing a gaseous fluid medium and a liquid fluid medium, pressure-transmitting means between said gaseous fluid medium and said liquid fluid medium, first valve means for selectively releasing said liquid fluid medium from said chamber into said tire cavity at a predetermined pressure differential between the pressure in said chamber and the pressure in said tire cavity, a second valve means for communicating said gaseous medium from said tire cavity into said chamber, said second valve means being responsive to automatically open when the pressure of said gaseous fluid medium in said tire cavity is greater by a predetermined amount than the pressure of said gaseous medium in said chamber to move said gaseous fluid medium at the greater pressure into said chamber and said second valve means having a one-way construction with means for blocking passage of said gaseous fluid medium out of said chamber into said tire cavity and said first and second valve means being the only communication between said chamber and said space outside said chamber.

2. A fluid dispenser according to claim 1 wherein said pressure-transmitting means includes a flexible bladder within said chamber for containing said gaseous fluid medium.

3. A fluid dispenser according to claim 2 wherein said bladder is of a resilient stretchable material for expansion in said chamber upon release of said liquid fluid medium from said chamber.

4. A fluid dispenser according to claim 2 wherein said container is an elongated tubular body with a first end and a second end, said flexible bladder being in the form of an elongated tubular body with an open end and a closed end, and said second valve means being mounted in said open end of said bladder with at least a portion of said second valve means extending through said first end of said container.

5. A fluid dispenser according to claim 4 wherein said first valve means is mounted in said second end of said container.

6. A fluid dispenser according to claim 1 wherein said first valve means is removable from said second end of said container for filling said container with said liquid fluid medium.

7. A tire rim assembly having an inflatable tire mounted on a generally cylindrical rim of a wheel, a tire cavity enclosed by the tire and cylindrical rim and a fluid dispenser mounted on said rim, said fluid dispenser comprising an enclosed container, a divided chamber within said container for containing a gaseous fluid medium and a liquid fluid medium, pressure-transmitting means between said gaseous fluid medium and said liquid fluid medium, first valve means for selectively releasing said liquid fluid medium from said chamber into said tire cavity at a predetermined pressure differential between the pressure in said chamber and the pressure in said tire cavity, a second valve means communicating said gaseous medium from said tire cavity into said chamber, said second valve means being responsive to automatically open when the pressure of said gaseous fluid medium in said tire cavity is greater by a predetermined amount than the pressure of said gaseous medium in said chamber to move said gaseous fluid medium at the greater pressure into said chamber and said second valve means having a one-way construction with means for blocking passage of said gaseous fluid medium out of said chamber into said tire cavity.

8. A tire rim assembly according to claim 7 wherein said container is mounted on the radially outer surface of said rim.

9. A tire rim assembly according to claim 8 wherein said container is in the form of an elongated tube and extends circumferentially around said rim with the ends of said tube being spaced apart.

10. A tire rim assembly according to claim 9 wherein said tube is of a resilient material and has a generally circular configuration with an inner diameter less than the diameter of said rim permitting separation of said ends in mounting on said rim and providing resilient gripping of said rim.

11. A tire rim assembly according to claim 9 wherein said ends of said tube are positioned with a tire inflation valve extending through said rim between said ends of said tube.

12. A tire rim assembly according to claim 11 wherein said first valve means is mounted in one of said ends of said tube and said second valve means is mounted in the other of said ends of said tube.

13. A tire rim assembly according to claim 7, wherein said container is mounted on a radially inner surface of said rim, said first valve means and said second valve means being in communication through said rim with said tire cavity.

14. A tire rim assembly according to claim 13 wherein said container is in the form of an elongated tubular body and has a first end and a second end, said elongated tubular body extending circumferentially around said rim.

15. A tire rim assembly according to claim 14 wherein said first valve means is mounted in said second end of said tubular body and said second valve means is mounted in said first end of said tubular body.

16. A method of dispensing liquid fluid from a container mounted on a rim of a tire rim assembly into a tire cavity enclosed by the tire and rim, said container having a divided chamber, a pressure-transmitting means in said chamber, first one-way valve means for releasing a liquid fluid medium from said chamber and second one-way valve means for automatically communicating a gaseous fluid medium from said tire cavity into said chamber when the pressure in said tire cavity is greater than the pressure in said chamber by a first predetermined amount comprising placing a quantity of liquid fluid medium in a first section of said divided chamber, increasing the pressure of said gaseous fluid medium in said tire cavity by inflation causing injection of said gaseous fluid medium into a second section of said divided chamber at a first predetermined pressure, retaining said gaseous fluid medium in said chamber by said second one-way valve means when the differential beween the pressure of said gaseous fluid medium inside and outside said container is under a second predetermined amount and releasing said liquid fluid medium into said tire cavity from said container through said first one-way valve means when said pressure differential is greater than said second predetermined amount whereby said liquid fluid medium is released into said tire cavity when the pressure in said tire cavity is reduced below a certain level.

17. The method of claim 16 wherein said tire cavity is inflated with said gaseous fluid medium to provide said first predetermined pressure within said second section of said divided chamber, said first predetermined pressure being greater than the normal operating pressure of said tire to provide a higher pressure of said gaseous fluid in said second section, and reducing the pressure in said tire cavity to normal operating pressure, said second predetermined amount of pressure differential between said liquid fluid medium within said second section and said gaseous fluid medium inside said tire cavity being the difference in pressure between said inflation pressure of said gaseous fluid medium in said second section and a low pressure less than said normal inflation pressure.

18. The method of claim 17 wherein said inflation pressure is around 40 p.s.i. and said low pressure is around 16 p.s.i. whereby said second valve means is set to open at said pressure differential of around 24 p.s.i. so that said liquid fluid medium is released when said operating pressure in said tire cavity falls below 16 p.s.i.

19. A method of dispensing liquid fluid from a container having a divided chamber, a pressure-transmitting means in said chamber, first one-way valve means for releasing a liquid fluid medium from said chamber and second one-way valve means for automatically communicating a gaseous fluid medium from space outside said container into said chamber when the pressure is greater than the pressure in said chamber by a first predetermined amount comprising placing a quantity of liquid fluid medium in a first section of said divided chamber, bleeding of residual gaseous fluid medium from said first section by preliminary inflation of said gaseous fluid medium into a second section of said divided chamber, increasing the pressure of said gaseous fluid medium in said space outside said container causing injection of said gaseous fluid medium into said second section of said divided chamber at a first predetermined pressure, retaining said gaseous fluid medium in said chamber at substantially said first predetermined pressure by said second one-way valve means when the pressure of said gaseous fluid medium inside said container is greater than the pressure outside said container by said first predetermined amount and releasing said liquid fluid medium from said container through said first one-way valve means when the pressure inside said container is greater than the pressure outside said container by a second predetermined amount whereby said liquid fluid medium is released when the pressure outside said container is reduced below a certain level.

* * * * *